United States Patent

Vives et al.

[11] Patent Number: 5,310,434
[45] Date of Patent: May 10, 1994

[54] PROCESS FOR JOINING ELEMENTS IN THE MANUFACTURE OF THERMOSTRUCTURAL COMPOSITE MATERIAL PARTS

[75] Inventors: Michel Vives, Eysines; Yvon Sourdoulaud, Artigues, both of France

[73] Assignee: Societe Europeenne De Propulsion, Suresnes, France

[21] Appl. No.: 973,212

[22] Filed: Nov. 6, 1992

Related U.S. Application Data

[63] Continuation of Ser. No. 494,180, Mar. 14, 1990, abandoned.

[30] Foreign Application Priority Data

Mar. 30, 1989 [FR] France ............... 89 04181

[51] Int. Cl.⁵ .................. B32B 31/24; B32B 7/08
[52] U.S. Cl. ....................... 156/92; 156/83; 156/91; 156/293; 156/305; 264/29.1; 427/249
[58] Field of Search .......... 156/91, 92, 94, 83; 427/249, 248.1; 264/29.5, 29.1; 428/52, 223; 411/908, 909, 501

[56] References Cited

U.S. PATENT DOCUMENTS

| | | | |
|---|---|---|---|
| 2,458,152 | 1/1949 | Eakins | 264/230 |
| 3,354,260 | 11/1967 | Brandt | 411/909 |
| 3,991,248 | 11/1976 | Bauer | 428/245 |
| 4,514,240 | 4/1985 | Heraud | 156/185 |
| 4,515,847 | 5/1985 | Taverna et al. | 264/29.5 |
| 4,546,032 | 10/1985 | Vasilos | 428/223 |
| 4,556,591 | 12/1985 | Bannink, Jr. | 428/43 |
| 4,576,836 | 3/1986 | Colmet et al. | 427/255 |
| 4,643,940 | 2/1987 | Shaw | 428/323 |
| 4,654,100 | 3/1987 | Yats | 156/296 |
| 4,752,503 | 6/1988 | Thebault | 427/248.1 |
| 4,859,128 | 8/1989 | Brecz et al. | 411/908 |
| 4,863,660 | 9/1989 | Cahuzac et al. | 156/173 |
| 4,929,505 | 5/1990 | Washburn et al. | 156/92 |

FOREIGN PATENT DOCUMENTS

| | | |
|---|---|---|
| 0268957 | of 0000 | European Pat. Off. |
| 3640484 | of 0000 | Fed. Rep. of Germany |
| 2028230 | 3/1980 | United Kingdom |

Primary Examiner—Michael W. Ball
Assistant Examiner—Daniel J. Stemmer
Attorney, Agent, or Firm—Weingarten, Schurgin, Gagnebin & Hayes

[57] ABSTRACT

A structural connection is obtained between elements (21, 22) of the reinforcement texture to be assembled by using at least one blocking means (23). The latter is made of a fibrous texture that is compacted prior to being inserted in a corresponding lodging formed in at least one of the elements of the reinforcement texture in order to conform with the shape of the lodging. The blocking means (23) then locks itself into the lodging by relaxation of its fibrous texture, as a result of a removal of the prior compacting. The blocking means can be in the form of a dowel (23) inserted inside aligned lodgings formed in the elements (21, 22) of the reinforcement texture to be assembled, or may alternatively be part of one of the elements of reinforcement texture to be assembled.

10 Claims, 4 Drawing Sheets

PROCESS FOR JOINING ELEMENTS IN THE MANUFACTURE OF THERMOSTRUCTURAL COMPOSITE MATERIAL PARTS

This application is a continuation of application Ser. No. 07/494,180, filed Mar. 4, 1990 now abandoned.

BACKGROUND OF THE INVENTION

1. Field of the invention

The present invention relates to a process for joining elements in the manufacture of thermostructural composite material parts.

Thermostructural composite materials essentially comprise a fibrous reinforcement texture, substrate, or preform, comprising an arrangement of reinforcing fibers, densified by a matrix around the fibers. The fibers of the reinforcement texture and the matrix material are selected to satisfy applications requiring excellent mechanical characteristics at high temperatures. Typical examples of thermostructural composite materials include carbon-carbon materials (carbon fiber reinforcement texture and carbon matrix), carbon-ceramic (carbon fiber reinforcement structure and ceramic matrix, e.g. silicon carbide), and ceramic-ceramic (ceramic fiber reinforcement structure and ceramic matrix).

In some applications, especially in the space and aviation field, there is an ever-increasing need for large-size parts made of thermostructural composite materials. This is e.g. the case with stiffening web assemblies forming structural parts of a space vehicle.

2. Prior art

A large-size part could be produced from several separately produced parts that are finally assembled by mechanical means or gluing. However, known methods for assembling prefabricated elements made of thermostructural composite materials are difficult to put into practice, or do not give complete satisfaction.

One solution would consist in producing the elements of reinforcement texture separately, assembling them, possibly after a pre-densification step, and then providing a simultaneous densification by infiltration of the matrix material into the porosity of the reinforcement texture formed by the assembled elements of reinforcement texture. The elements of reinforcement texture are assembled simply by bringing them into mutual contact and holding them in contact by means of a tool. The linking between the elements of reinforcement texture results from the co-infiltration, or simultaneous infiltration, of the matrix material into the porous structure of these elements as they are held in contact. This co-infiltration can e.g. be obtained by means of a well-known method of chemical vapor deposition.

This type of linking by co-infiltration requires large contact surfaces to obtain an effective link by the matrix material, and presents a permanent risk of cohesion loss, both during manufacture and in use.

SUMMARY OF THE INVENTION

The aim of the present invention is therefore to provide a process that makes it possible to produce large-size thermostructural composite material parts without the drawbacks of the prior art processes.

More specifically, the aim of the invention is to provide a process for the manufacture of thermostructural composite material parts by the co-densification, or simultaneous densification, of pre-assembled elements of reinforcement texture, such that the resulting parts present no risk of cohesion loss, even when the area of mutual contact between the elements of reinforcement texture is small.

According to the invention, this aim is achieved by providing a structural connection between the elements of reinforcement texture by at least one blocking means or connecting element having a fibrous texture that is subjected to compacting prior to engagement inside a corresponding lodging formed in at least one of said elements of said reinforcement texture in order to conform to the shape of said lodging and lock thereinto by relaxation of said fibrous texture upon elimination of the compacting.

The locking of the blocking means into its corresponding lodging ensures an effective pre-assembly of the elements of the reinforcement texture prior to co-densification by the matrix and acts to prevent cohesion loss during the part's densification stage. Moreover, this locking effect combines with the bonding by the matrix material co-infiltrated into the porous elements in the reinforcement texture, including the blocking means. This guarantees an effective linking that virtually eliminates the risk of cohesion loss when the part is used, while requiring but a small area of surface contact between the pre-assembled elements of reinforcement texture.

The blocking means can be in the form of a dowel of fibrous texture engaged inside registered lodgings formed within the elements of reinforcement texture to be assembled. Alternatively, the blocking means can comprise a portion of one of the elements of reinforcement texture to be assembled.

The fibers that form elements of the reinforcement texture and the fibers forming the fibrous texture of the blocking means are made of the same substance, such as carbon or ceramic, or materials that are inter-compatible as regards thermal effects (e.g. expansion).

The compacting of the blocking means can be achieved by means of a tool in which the blocking means is held until the insertion thereof in the corresponding lodging.

Alternatively, the blocking means can be maintained in its compacted state by impregnation with a product binding together the fibers of the fibrous texture of the blocking means in order to maintain the blocking means in a compacted state, the impregnating product being capable of being eliminated or softened to allow a relaxation of the fibrous texture after insertion of the compacted and impregnated blocking means into the corresponding lodging.

BRIEF DESCRIPTION OF THE DRAWINGS

The present invention shall be more easily understood upon reading the following description given as a non-limiting example, with reference to the appended drawings in which.

DETAILED DESCRIPTION OF THE PREFERRED EMBODIMENTS

Generally speaking, the present invention is applicable to the manufacture of a composite part having a reinforcement texture or substrate produced as several separate elements that are subsequently assembled and then simultaneously densified to obtain the final part.

Figure 1:
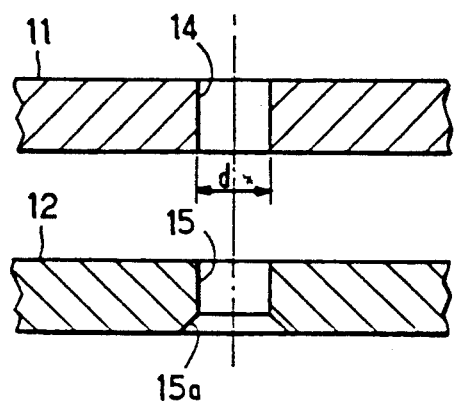
FIGS. 1 to 5 illustrate the successive stages in the manufacture of a thermostructural composite material part by co-densification of the assembled elements of reinforcement texture to a first embodiment of the process according to the invention.

In the example illustrated by FIGS. 1 to 5, the composite part under manufacture is obtained by densification of a reinforcement texture formed by assembling two plate-shaped elements of reinforcement texture 11 and 12 (FIG. 1). Any known type of fibrous reinforcement texture can be used for the composite materials forming the elements 11 and 12, to endow the part with the properties required for its intended use. Accordingly, elements 11 and 12 can be made of the same fibrous texture formed e.g. by a superposition of layers. The latter can be layers of material not linked together (two-dimensional, or 2D, textures) or inter-linked e.g. by implantation of threads running transversally with respect to the layers, or by needling (three-dimensional, or 3D, textures). Depending on the shape of the parts to be produced, elements 11 and 12 may have shapes of varying complexity, e.g. shapes with a profiled cross-section. The elements 11 and 12 can be maintained in the appropriate form by impregnation of the fibrous texture by a resin. The latter is e.g. chosen for its capability of being eliminated before or during the infiltration of the matrix, or for leaving a residue compatible with the material of the matrix.

In some instances, the elements 11 and 12 can be consolidated, or weakly or partially densified, by the selected matrix material deposited by chemical vapor deposition or liquid infiltration.

The structural assembling of elements 11 and 12 is performed by means of one, and preferably several dowels 13 that are inserted and locked into lodgings each formed by bores 14 and 15 that are registered and formed in the parts of the plates 1 12 that come into mutual contact to make up the complete reinforcement texture of the part being manufactured. In order to maintain an adequate hold at the level of the bores, the elements 11 and 12 are preferably made of an impregnated 2D texture, or a 3D texture, and preferably a needled 3D texture. For the sake of simplicity, only one dowel 13 and only one assembly corresponding to the bores 14, 15 are shown in the figures. As can be seen in FIG. 1, for instance, a chamfer 15a is formed at the end of the bore 15 on the side of the plate 12 opposite the side contacting plate 11.

Figure 2:
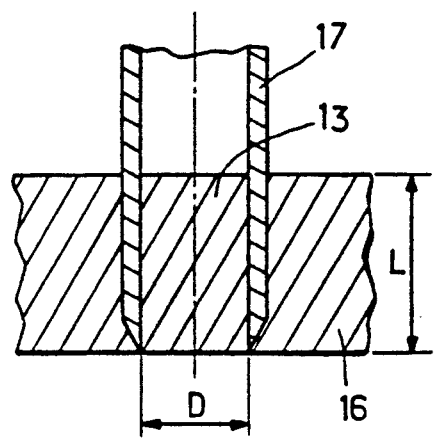
Figure 3:
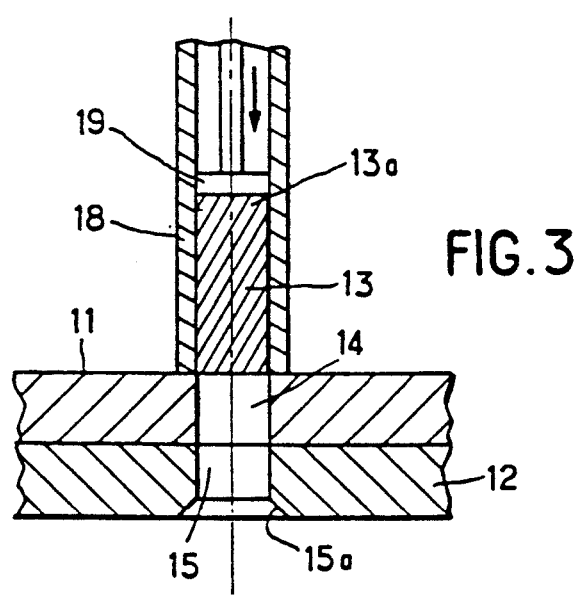
Figure 4:
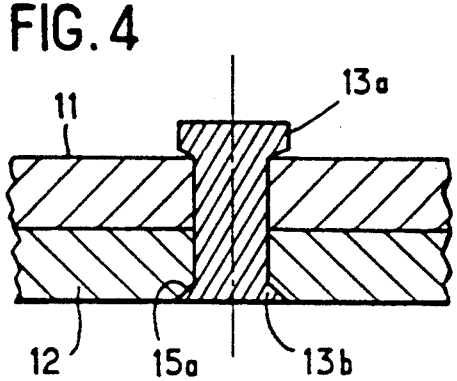
Figure 5:
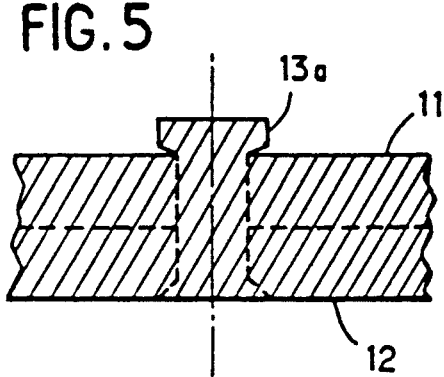

As shown in FIG. 2, the dowel can e.g. be obtained by cutting out a cylinder in a plate 16 of 3D fibrous texture by means of a tool 17. The length L of the cylinder (i.e. the thickness of the plate 16) is slightly greater than the thicknesses of plates 11 and 12 (i.e. the length of the lodging formed by the bores 14 and 15 end-to-end), while the diameter of the cylinder is greater than the diameter d of the bores 14 and 15 and is at least equal to the maximum diameter of bore 15 at the level of the chamfer 15a.

After the dowel 13 is cut out, it is compacted circumferentially and lodged inside a tube 18 whose inner diameter is substantially equal to that of bores 14 and 15. The tube 18 is positioned coaxially with the bores 14 and 15 of the assembled parts 11 and 12 (FIG. 3) so that the dowel 13 can be introduced into the latter by means of a piston 19 guided in the tube 18 and pressing against an end 13a of the dowel 13.

The insertion of the dowel 13 is carried out e.g. from the side of plate 11 and continues until its end 13b opposites that acted upon by the piston 19 reaches the level of the outer face of plate 12. After withdrawal of the tube 18, the dowel 13 assumes the shape illustrated in FIG. 4. The compacting effect of the tube 18 having ceased, the fibrous texture of the dowel 13 is relaxed at its end 13b to occupy the chamfered part of the bore 15 at its end 13a, so forming a head at the side of the outer face of plate 11, the length L of the dowel being greater than the sum of the thicknesses of plates 11 and 12. The tapered end 13b of the dowel 13 and the head 13a of the latter have the effect of locking the dowel 13 in the bores 14 and 15, so creating a structural connection by the presence of obstacles between the elements of the reinforcement texture 11 and 12. The dowel 13 remains compacted between its end portions 13a and 13b.

After the plates 11 and 12 have been assembled, they are densified together, along with the dowel 13. The densification is obtained e.g. by chemical vapor infiltration of the matrix material inside the accessible pores of the fibrous texture. With the elements of the fibrous reinforcement texture assembled by a structural connection, it is possible to maintain perfect cohesion of the assembly during densification. Once the matrix is deposited (FIG. 5), its constituent material serves to adhere the elements 11 and 12 and the dowel 13 by virtue of the continuity of the interface between them. I.e., the interface is uninterrupted which allows the constituent material to adhere the elements and the dowel. This adhesion, in combination with the mechanical locking produced by the dowel 13, endows the finished part with a high degree of resistance to cohesion loss. After densification, the head 13a of the dowel 13 protruding towards the outside can be machined away. Alternatively, a chamfer is also formed at the end of the bore 14 on the outside face of plate 11, the length of the dowel in that case being substantially equal to the sum of the thicknesses of plates 11 and 12. A structural linkage, with blocking between the elements 11 and 12, is obtained by expansion of the dowel at its two ends in the respective conical parts having a greater diameter than the bores 14 and 15.

In another embodiment, the bores 14 and 15 are made without a chamfer, and the dowel 13 is sufficiently long to form a head by expansion of the fibrous texture at each of its ends protruding outside the bores 14 and 15, the blocking effect being produced by the heads formed at the two ends of the dowel and pressing on the outer faces of plates 11 and 12.

Figure 6:
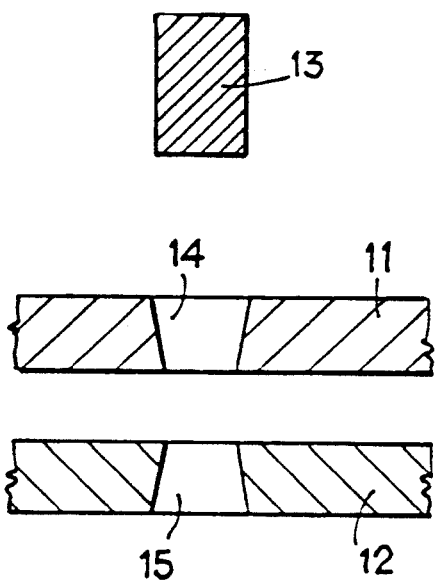
FIGS. 6 and 7 illustrate an alternative method for assembling the elements of reinforcement texture.
Figure 7:
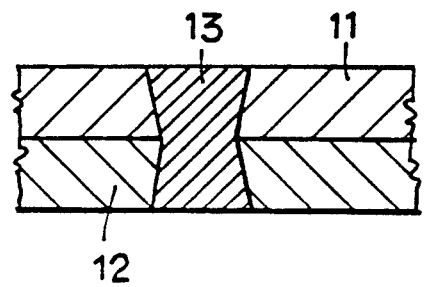

In yet another embodiment, shown in FIG. 6, the bores 14 and 15 formed in plates 11 and 12 are conical, with the large diameter located on the outer face of the plates. After being introduced into the axially aligned bores 14 and 15, e.g. using the type of means shown in FIG. 3, the dowel 13 occupies all the volume of the bores 14 and 15 and mutually locks the plates 11 and 12 together (FIG. 7).

Figure 8:
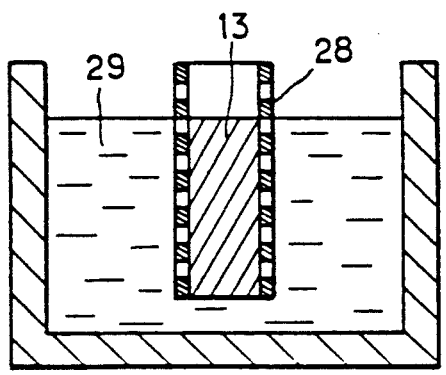
FIGS. 8 to 10 illustrate an alternative method for compacting the blocking means and maintaining the latter in a compacted state.
Figure 9:
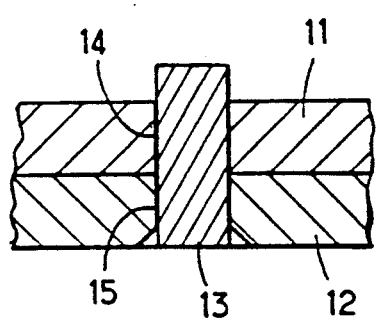
Figure 10:
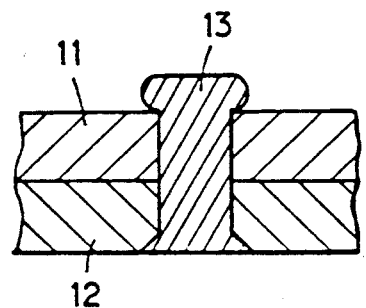

FIGS. 8 to 10 show another method for keeping the dowel 13 made of fibrous texture compacted before it is locked inside the bores 14 and 15 of elements 11 and 12.

The dowel 13, which is obtained e.g. by cutting out a plate of 3D type fibrous texture as shown in FIG. 2, is circumferentially compacted while being introduced inside a cylindrical sleeve 28 that may be drilled (FIG. 8). The dowel 13 thus held in a compacted state is impregnated with a resin by immersion in a bath 29.

After resin impregnation, followed by a drying stage, the sleeve 28 can be removed and the dowel 13, held in its compacted state by the resin, is introduced into the bores 14 and 15 (FIG. 9).

The impregnating resin is selected according to its ability to be eliminated, or at least softened, prior to infiltration of the matrix. The elimination or softening of the resin has the effect of suppressing the compacting effect (FIG. 10), so that the dowel 13 locks itself into the bores 14 and 15 by relaxation of the fibrous texture in the manner described above with reference to FIGS. 1 to 5.

The elimination or softening of the impregnating resin is achieved by a chemical treatment or by raising the temperature. In the latter case, it would be advantageous to use the temperature rising phase preceding the infiltration as such of the matrix material.

Preferably, use is made of a fugitive resin that is eliminated by a thermal treatment, practically without trace of a residue, prior to co-densification of the elements 11 and 12. A resin that leaves a residue after softening or pyrolysis can be used so long as the residue is compatible with the matrix material.

Alternatively, a dowel 13 compacted in sleeve 28 is impregnated by a liquid that is solidified by cooling so that the dowel retains its compacted state after removal of the sleeve 28. The thawing out of the impregnating liquid causes the texture of the dowel 13 to relax once the dowel has been placed into position.

Figure 11:
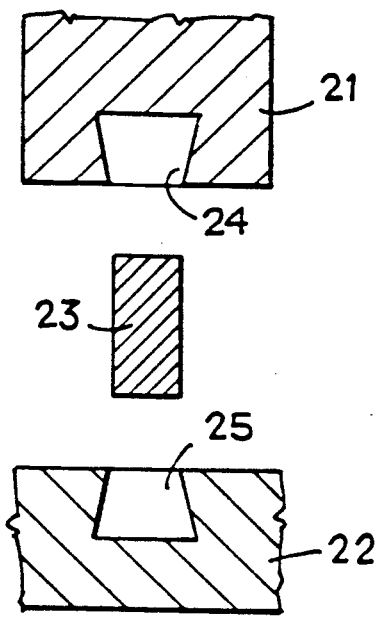
FIGS. 11 and 12 illustrate other alternative methods for assembling the elements of reinforcement texture.
Figure 12:
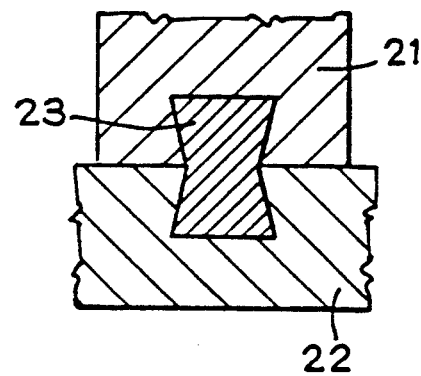

FIGS. 11 and 12 show the assembly of two parts of a reinforcement texture 21 and 22 by compacted and impregnated dowels 23 each introduced in two frusto-conical blind holes 24 and 25 formed in respective parts 21 and 22. The diameters of the holes 24 and 25 increase when going towards the blind end, so that the dowel 23 locks the parts 21 and 22 together upon relaxing from its compacted state.

Figure 13:
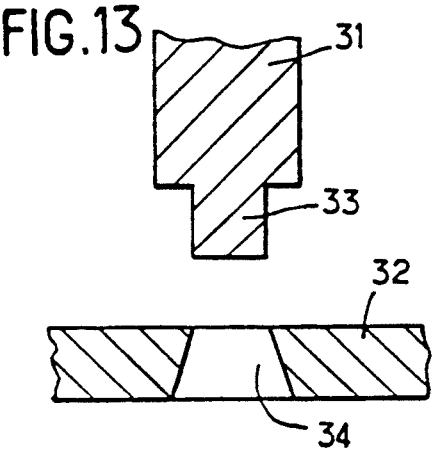
FIGS. 13 and 14 illustrate the successive stages in the manufacture of a thermostructural material part according to a second embodiment of the present invention.
Figure 14:
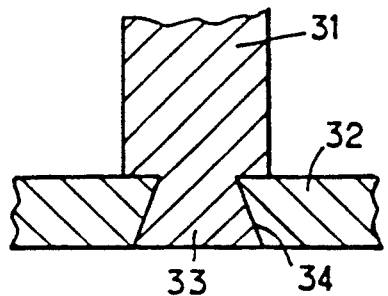

FIGS. 13 and 14 illustrate yet another embodiment of the invention according to which the blocking means between the elements of reinforcement texture are formed by portions of at least one of the elements to be assembled. Here, the composite part is obtained by densification of a fibrous reinforcement texture formed by assembling two elements 31 and 32. Element 31 is e.g. in the form of a plate intended to be assembled perpendicularly to element 32 which is also in the form of a plate. Assembling is achieved by means of finger portions 33, formed on one edge of element 31, and intended to penetrate into holes 34 formed in element 32. The finger portions 33 and holes 34 are obtained by machining (in the figures, only one finger 33 and only one hole 34 are shown for the sake of simplicity).

As shown in FIG. 13, the finger portion 33 has a cylindrical shape and is machined in the texture of element 31 after the latter has been at least locally compacted and impregnated. The hole is a frusto-conical through hole or blind hole depending on the thickness of element 32. The finger 33 is introduced in a compacted state into the hole 34. The diameter of the finger 33 is chosen so that the finger, after loosening of the compacting, fills up all the volume of hole 34 (FIG. 14).

After assembly, the elements 31 and 32 are co-densified by chemical vapor infiltration of the matrix material. The latter creates an adhesion between the elements 31 and 32 that combines with the structural link provided by the fingers 33 to ensure that the finished part has the required cohesive strength.

Figure 15:
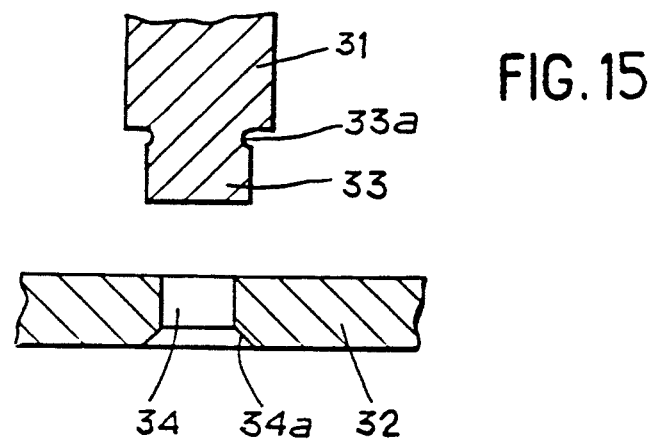
FIG. 15 illustrates an alternative to the method of FIGS. 13 and 14.

Alternatively, as shown in FIG. 15, the holes 34 are bores having a cylindrical shape, with a chamfer 34a formed at one end of the bore to allow the finger 33 to lock in the bore by expansion of the finger's texture or the level of the chanfer. A neck 33a can be formed at the base of the fingers 33 so as to avoid, after relaxation of the finger's fibrous texture, the formation of bulges at the interface between the elements 31 and 32.

As already explained, the invention has particular applications in the manufacture of thermostructural composite material parts forming stiffened web structures.

Figure 16:
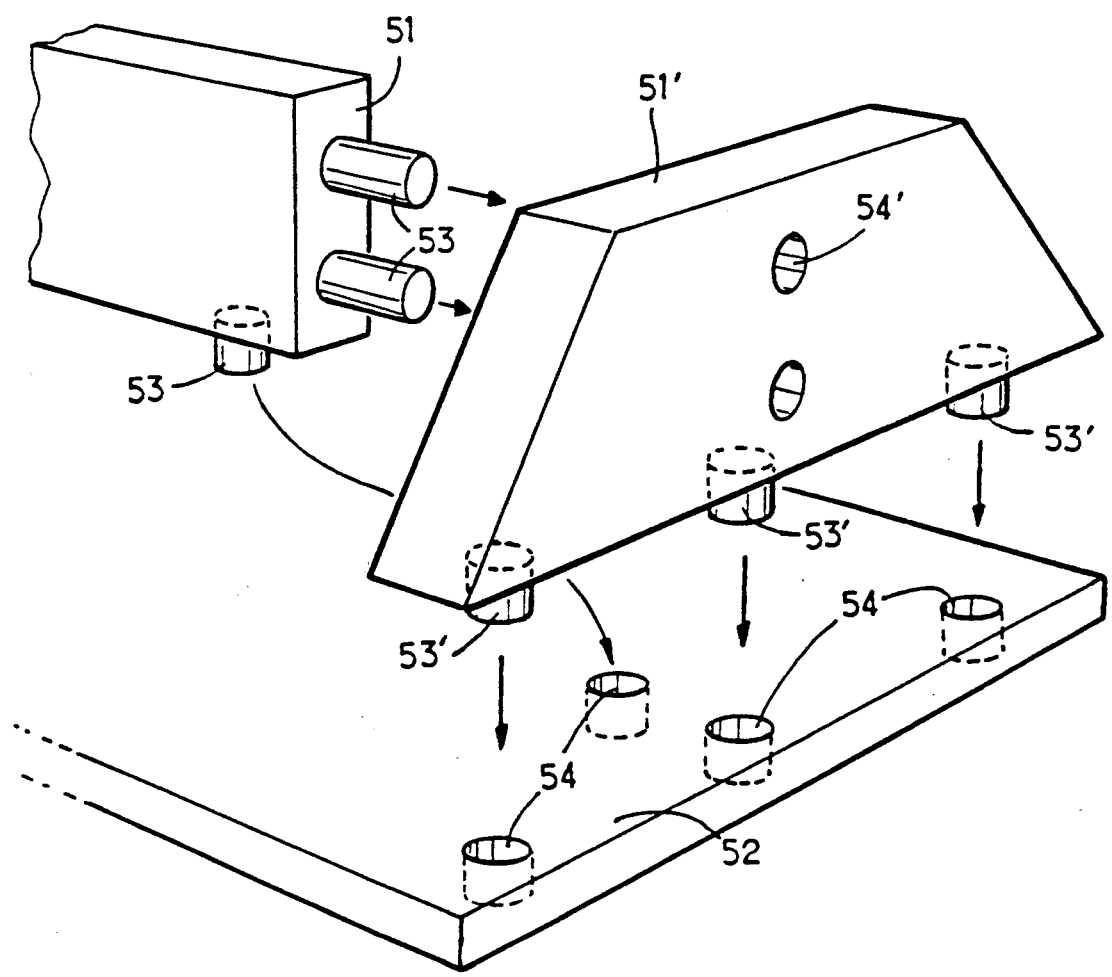
FIG. 16 illustrates an application of the inventive process for the production of a thermostructural composite material part in the form of a web provided with stiffening elements.

The fibrous reinforcement texture is then produced in the form of distinct elements corresponding to the portions of the part constituting the stiffeners 51 and 51' and the web 52. The elements of reinforcement texture are assembled structurally, using an obstacle defined by finger portions 53, 53' formed on the edges of elements 51 and 51', to link bores 54 formed in element 52 to receive finger portions 51 and 51', and bores 54' formed in element 51' to receive finger portions 53, as shown in FIG. 16.

Instead of being made integral with one of the elements of the reinforcement texture, the linking means 53 and 53' can be made in the form of distinct slugs or dowels that are put into place in the registered holes of the elements to be assembled.

What is claimed is:

1. A process for the manufacture of thermostructural composite material parts having a fibrous reinforcement substrate densified by a matrix, said process comprising:
   forming at least two structural elements from an arrangement of reinforcing fibers;
   forming at least a lodging in at least one of the structural elements;
   forming a connecting element for joining the two structural elements from an undensified arrangement of reinforcing fibers;
   compacting the connecting element to a size and shape suitable to be introduced into the lodging in the structural element to form an undensified compacted connecting element;
   engaging the undensified compacted connecting element in the lodging in the structural element to form an uninterrupted connecting element/lodging interface suitable for co-infiltration of a matrix material;
   eliminating the compaction of the connecting element to allow the arrangement of reinforcing fibers forming the connecting element to expand and provide mutual contact between fibers of the connecting element and fibers in the lodging along substantially the entire connecting element/lodging interface to lock the connecting element in the lodging forming an assemblage prior to co-densification, said assemblage including the structural elements and the connecting element; and
   co-densifying said assemblage including the structural elements and the connecting element with said matrix material to effect co-infiltration of said matrix material along substantially said entire connecting element/lodging interface.

2. The process of claim 1 wherein the connecting element is in the form of a dowel.

3. The process of claim 1 wherein the structural elements are impregnated with a resin prior to engaging the connecting element in the lodging.

4. The process of claim 1 wherein the structural elements are weakly densified with a matrix material prior to engaging the connecting element in the lodging.

5. The process of claim 4 wherein the assemblage of the structural elements and the connecting element are densified with the matrix material used for the weak densification of the structural elements.

6. The process of claim 1 wherein the connecting element is comprised of a portion of one of the structural elements.

7. The process of claim 1 wherein the connecting element is compacted with a tool in which the connecting element is held until engagement with the structural elements.

8. The process of claim 1 wherein the connecting element is impregnated with a binding product which binds together the connecting element fibers to maintain the connecting element in a compacted state.

9. The process of claim 8 wherein the binding product is eliminated to allow relaxation of the connecting element fibers after engagement of the connecting element with the structural elements.

10. The process of claim 8 wherein the binding product is softened to allow a relaxation of the connecting element fibers after engagement of the connecting element with the structural elements.

* * * * *

UNITED STATES PATENT AND TRADEMARK OFFICE
CERTIFICATE OF CORRECTION

PATENT NO. : 5,310,434
DATED : May 10, 1994
INVENTOR(S) : Michel Vives, et al.

It is certified that error appears in the above-indentified patent and that said Letters Patent is hereby corrected as shown below:

Column 3, line 49, "plates 1 12" should read --plates 11, 12--.

Column 8, line 10, "allow relaxation" should read --allow a relaxation--.

Signed and Sealed this

Tenth Day of January, 1995

Attest:

BRUCE LEHMAN

Attesting Officer     Commissioner of Patents and Trademarks